United States Patent
Doran et al.

(10) Patent No.: US 9,470,251 B1
(45) Date of Patent: Oct. 18, 2016

(54) WATER ACTIVATION DEVICE

(71) Applicant: EcoAeon USA, Inc., Whitefish, MT (US)

(72) Inventors: Paul S. Doran, Columbia Falls, MT (US); Alykhan Tharani, Deddington (GB)

(73) Assignee: EcoAeon USA, Inc., Whitefish, MT (US)

( * ) Notice: Subject to any disclaimer, the term of this patent is extended or adjusted under 35 U.S.C. 154(b) by 0 days.

(21) Appl. No.: 14/703,672

(22) Filed: May 4, 2015

Related U.S. Application Data

(60) Provisional application No. 61/987,897, filed on May 2, 2014.

(51) Int. Cl.
 *F15C 1/16* (2006.01)

(52) U.S. Cl.
 CPC ...................... *F15C 1/16* (2013.01)

(58) Field of Classification Search
 CPC ............... F15C 1/16; Y10T 137/0391; Y10T 137/2087; Y10T 137/2104; Y10T 137/7976
 USPC .......... 137/808, 811, 13, 545, 546; 210/660, 210/661, 787, 222, 223, 243, 792, 174, 253, 210/280, 285, 304, 321.77, 321.9
 See application file for complete search history.

(56) References Cited

U.S. PATENT DOCUMENTS

| | | | | |
|---|---|---|---|---|
| 4,299,701 A | * | 11/1981 | Garrett | C02F 1/485 210/222 |
| 4,716,024 A | * | 12/1987 | Pera | B01J 19/087 210/222 |
| 4,904,381 A | * | 2/1990 | Urakami | C02F 1/481 210/222 |
| 5,000,872 A | * | 3/1991 | Olah | B01F 3/0811 137/13 |
| 5,006,246 A | * | 4/1991 | Edwards | B01J 47/022 210/264 |
| 5,945,005 A | * | 8/1999 | Junius | B01D 24/002 210/786 |
| 6,210,572 B1 | * | 4/2001 | Tulchinskiy | B01D 27/06 184/6.25 |
| 7,094,342 B2 | * | 8/2006 | Tamura | C02F 1/005 210/198.1 |
| 7,473,374 B2 | * | 1/2009 | Suddath | C02F 1/005 210/198.1 |
| 8,262,753 B2 | * | 9/2012 | Carew | A01K 63/045 210/276 |
| 8,835,704 B2 | * | 9/2014 | Hornung | C10B 7/10 201/2.5 |
| 2002/0030017 A1 | * | 3/2002 | Martin | B01D 24/08 210/675 |
| 2003/0029795 A1 | * | 2/2003 | Galik | B01D 11/0457 210/634 |
| 2003/0168393 A1 | * | 9/2003 | Tsunematsu | C02F 1/481 210/222 |

(Continued)

FOREIGN PATENT DOCUMENTS

| | | |
|---|---|---|
| AT | 142032 | 6/1935 |
| JP | 2006289287 | 10/2006 |

*Primary Examiner* — Kevin Murphy
*Assistant Examiner* — Minh Le
(74) *Attorney, Agent, or Firm* — Jean Kyle

(57) ABSTRACT

A chamber directs water over blades that create a vortex. The blades are encased in a copper cage. Water passes a gold plated baffle as the entrance of the cage and exits through a silver plated baffle. Ceramic balls are positioned between the cage and the walls of the chamber. Movement of fluid through the vortex and around the ceramic balls activates and structures the water.

20 Claims, 6 Drawing Sheets

(56) References Cited

U.S. PATENT DOCUMENTS

| | | |
|---|---|---|
| 2004/0026307 A1 | 2/2004 | Tamura |
| 2004/0134847 A1* | 7/2004 | Lin ................ B01F 5/0665 210/202 |
| 2009/0101564 A1 | 4/2009 | Tamura |
| 2009/0261028 A1 | 10/2009 | Yamasaki |
| 2009/0272446 A1* | 11/2009 | Kolding .............. C02F 1/005 137/808 |
| 2010/0102010 A1* | 4/2010 | Nuckols, Jr. ....... A01K 63/045 210/793 |
| 2010/0202941 A1 | 8/2010 | Chikada |
| 2011/0147321 A1* | 6/2011 | Oz ..................... B01D 24/08 210/793 |
| 2012/0167991 A1* | 7/2012 | Feilner ............ B01D 19/0057 137/1 |
| 2013/0327727 A1* | 12/2013 | Hopper ........... B01D 17/0217 210/787 |
| 2014/0127091 A1* | 5/2014 | Wang .................... F28F 1/40 422/198 |
| 2014/0338768 A1* | 11/2014 | Marcic ................. F15D 1/02 137/808 |

\* cited by examiner

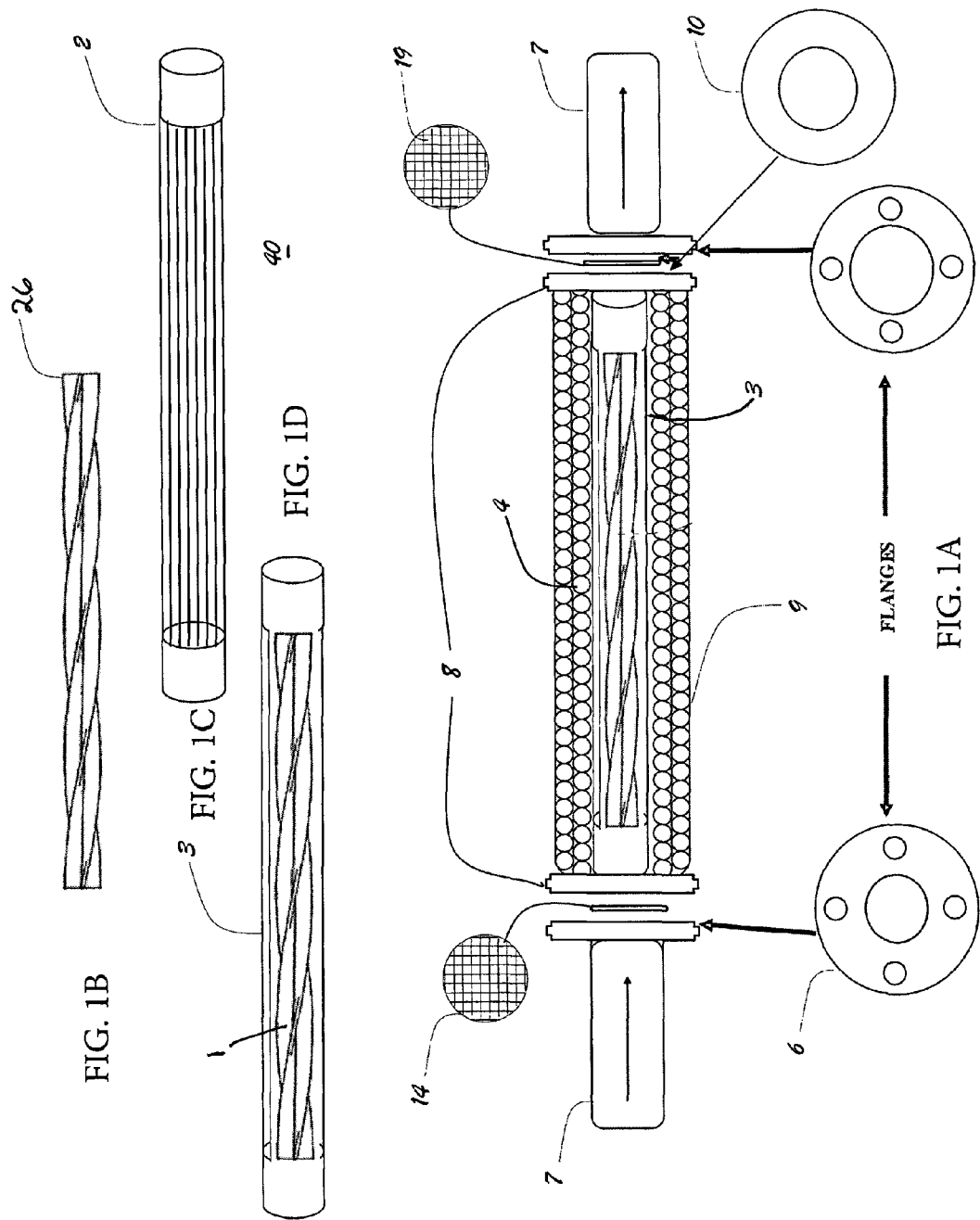

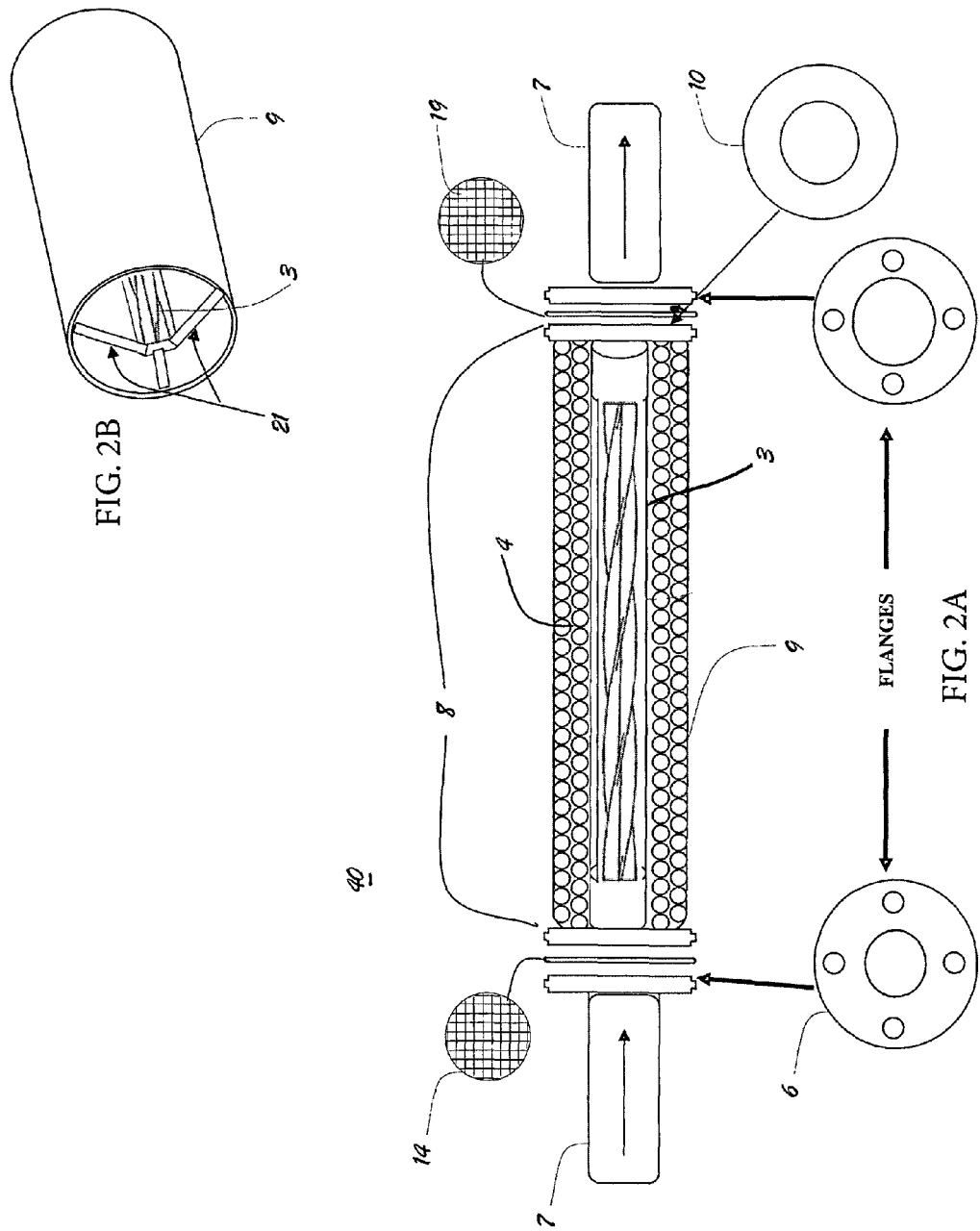

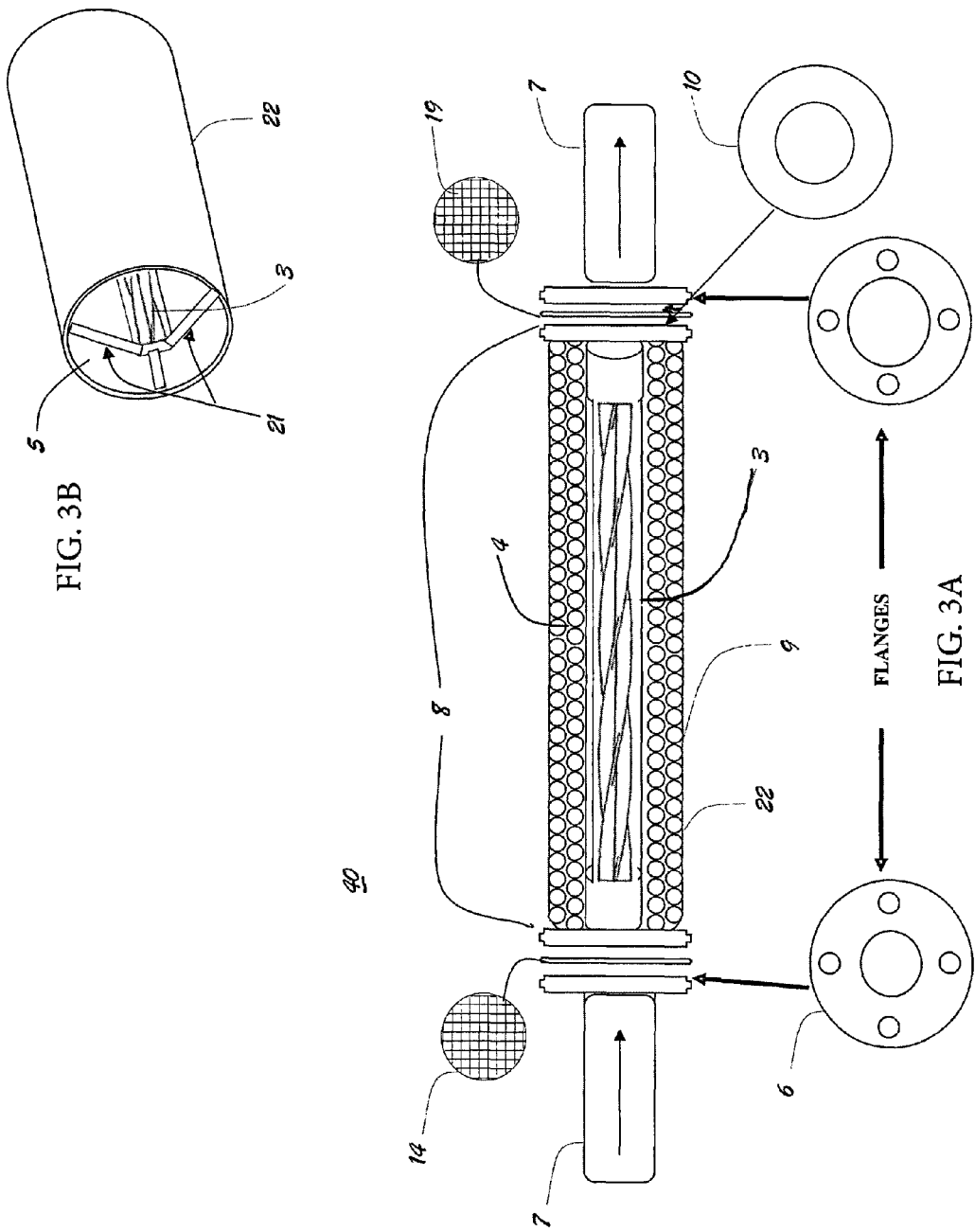

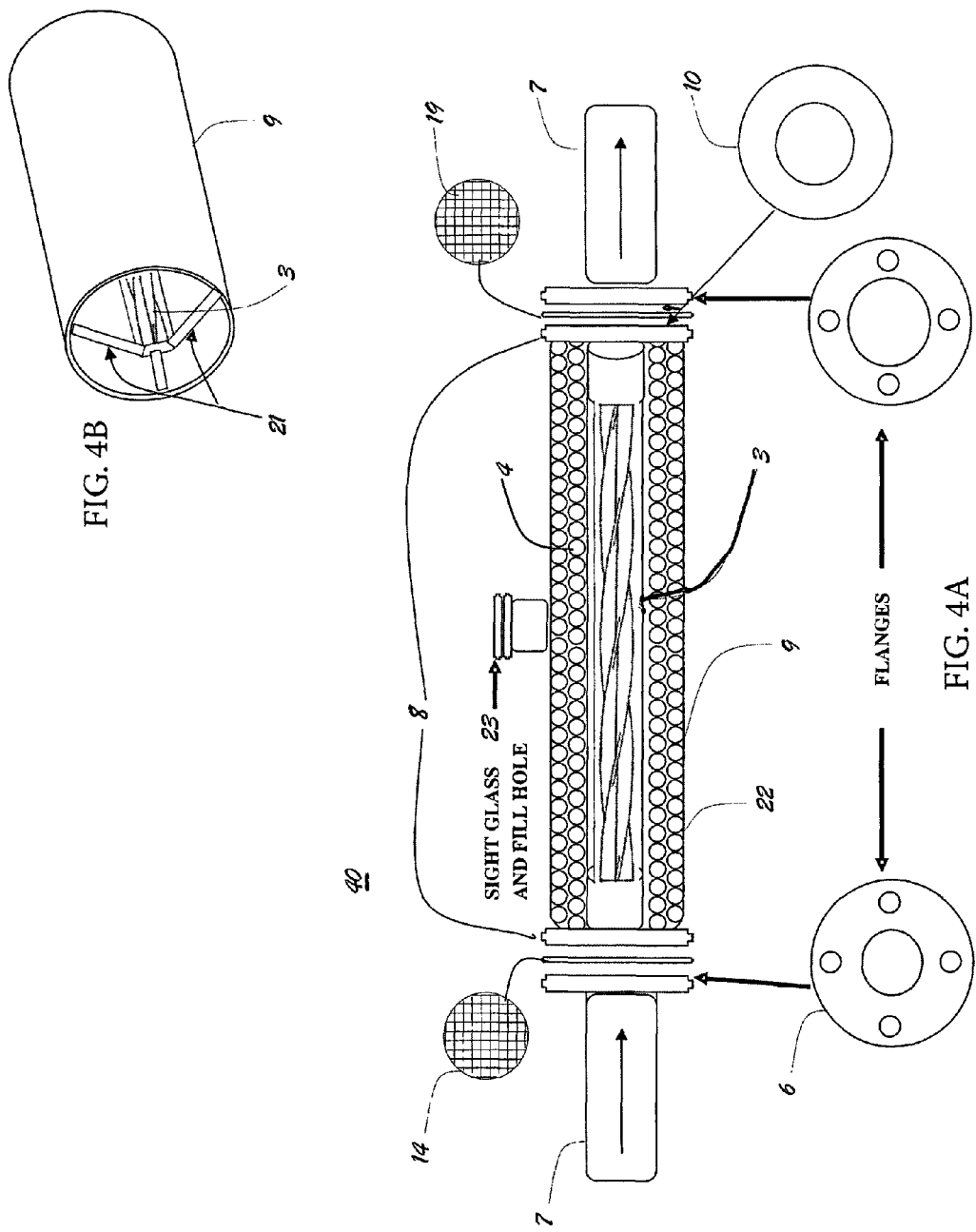

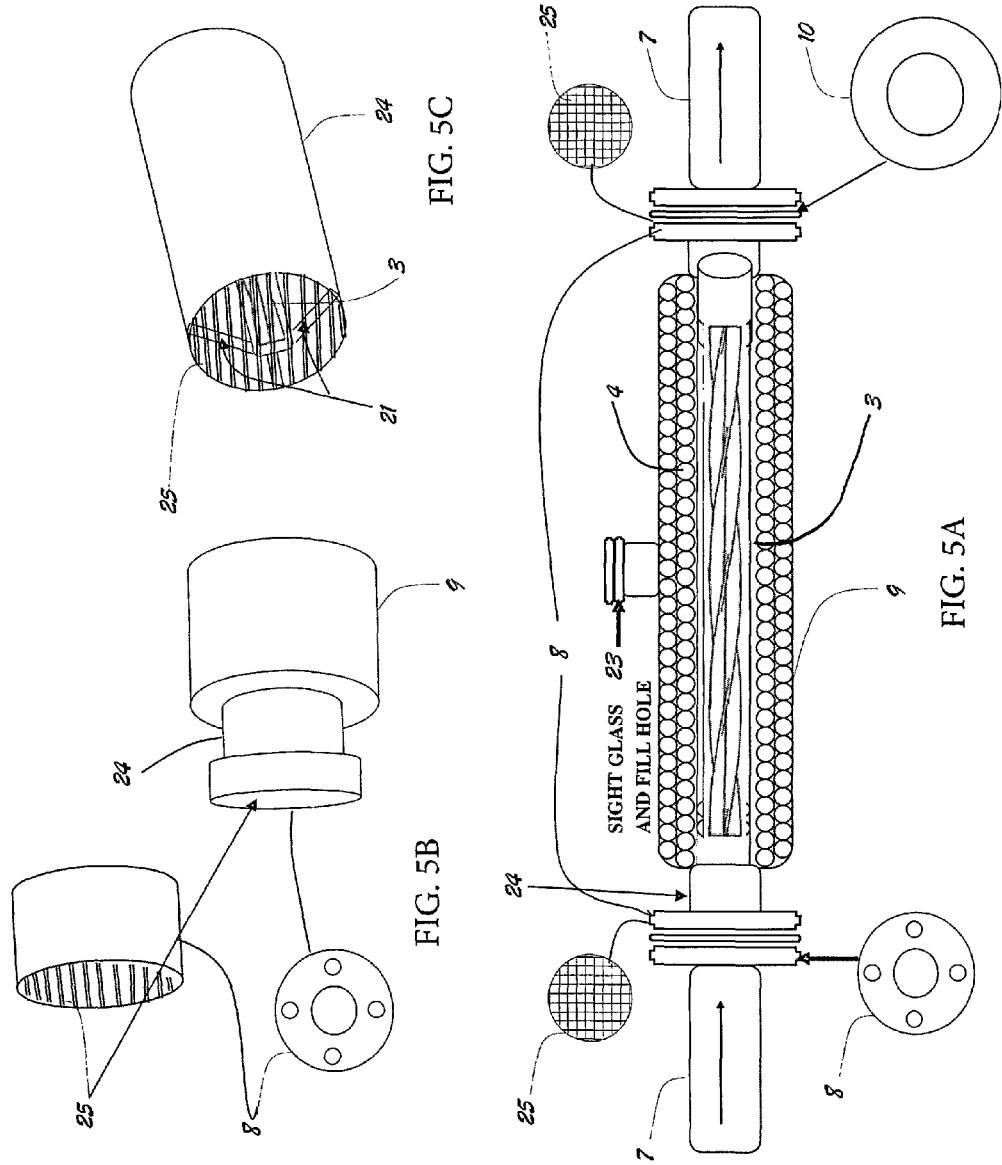

US 9,470,251 B1

WATER ACTIVATION DEVICE

CROSS-REFERENCE TO RELATED APPLICATIONS

This application claims the benefits of U.S. Provisional Application No. 61/987,897, filed May 2, 2014, the disclosure of which is hereby incorporated by reference in its entirety including all figures, tables and drawings.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Water is essential to life. The availability of clean, pure, and energized water is a necessity. A considerable amount of time and effort therefore has been spent trying to create devices to activate water. See, for example, U.S. Patent Application Publication 2004/0026307 A1; 2009/0101564 A1; 2009/0261028 A1; and 2010/0202941 A1, U.S. Pat. No. 7,473,374 B2, Japanese Patent Application 2006-289287, and Austrian Patent No. 142,032. Although these efforts have produced many devices, there remains a need for an effective means to provide highly structured and activated water.

All patents, patent applications, provisional patent applications and publications referred to or cited herein, are incorporated by reference in their entirety to the extent they are not inconsistent with the teachings of the specification.

BRIEF SUMMARY OF THE INVENTION

The invention involves a device to activate and structure water that can be placed in a water supply stream. The device can also be used to structure and activate various fluids including fuels. Thus, the subject device can be placed in a fuel supply line. A quadruple set of blades positioned in the center of a cylindrical chamber create a vortex as water flows through the chamber. The improved effectiveness of a four bladed helix produces an accelerated spin action of the water thus increasing the anti-scaling effect and molecular restructuring of various substances that may be in the water or the water itself by as much as two-fold. The helix blades are surrounded by a cage of either copper mesh or 316 stainless steel mesh. Ceramic balls fill the space between the chamber walls and the cage. Flowing water enters the chamber and passes through a gold plated baffle at one end of the cage. The vortex created by the blades moves the water through the chamber and around the ceramic balls. Water exits the chamber after passing a silver plated baffle at the other end of the cage. Water passing through the subject device undergoes activation by the spin action produced by the four activation chambers created by the vortex blades and resonation contact from the various metals, magnetic clay, and mineral composite ceramics.

BRIEF DESCRIPTION OF THE SEVERAL VIEWS OF THE DRAWING

FIG. 1A is a partially exploded schematic side view of a preferred embodiment of the water activation device of the subject invention.

FIG. 1B is a side elevational view of the four helical blades used in the embodiment shown in FIG. 1A.

FIG. 1C is a side elevational view of the copper cage used in the embodiment shown in FIG. 1A.

FIG. 1D is a side elevational view of the caged helix used in the embodiment shown in FIG. 1A.

FIG. 2A is a partially exploded schematic side view of another preferred embodiment of the water activation device of the subject invention.

FIG. 2B is a front perspective view of the caged helix secured within the chamber of the embodiment shown in FIG. 2A.

FIG. 3A is a partially exploded schematic side view of another preferred embodiment of the water activation device of the subject invention.

FIG. 3B is a front perspective view of the caged helix secured within the chamber of the embodiment shown in FIG. 3A.

FIG. 4A is a partially exploded schematic side view of another preferred embodiment of the water activation device of the subject invention.

FIG. 4B is a front perspective view of the caged helix secured within the chamber of the embodiment shown in FIG. 4A.

FIG. 5A is a partially exploded schematic side view of another preferred embodiment of the water activation device of the subject invention.

FIG. 5B is an exploded view of the inlet components of the embodiment shown in FIG. 5A.

FIG. 5C is a front perspective view of the caged helix used in the embodiment shown in FIG. 5A.

DETAILED DESCRIPTION OF THE INVENTION

Figure 6D:
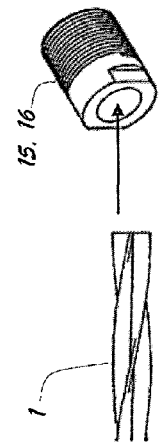
FIG. 6D is an exploded view of blade placement in the embodiment shown in FIG. 6A.

The invention involves a water activation device 40. Blades 26 create a vortex and four activation chambers 1 as the water moves through the device. The water also contacts and is enhanced by gold 14 and silver 16 baffles, a copper screen 2, and ceramic balls 4 as it travels through and is activated by the device.

Water passing through the subject device undergoes activation by the spin action produced by the four activation chambers created by the vortex blades and resonation contact from the various metals and magnetic clay and mineral composite ceramics. The subject device through its activation of water molecules enhances permeation thus improving nutrient absorption, essentially creating the ultimate water with which living organisms can thrive. The process of liquid enrichment or activation is accomplished by circulating water or liquid through ore based ceramic components. The structuring action or vortex motion of the water through the chamber draws connatural energy from the ceramic ores and upon receipt by the molecules an activation of the water molecules occurs. This process creates a structuring or clustering effect whereby the molecules become activated and energetic. The end result is liquid that quite significantly propagates increased cell rejuvenation and growth leading to both short-term and long-term recognizable results in living organisms (human, animal, and plant life).

When water is circulated through and around the ceramic ores, resonation occurs enabling the water to become more soluble and absorbable. Through this action of water activation, living organisms also become activated, promoting better growth and health. Greenhouse raised egg plants and cucumbers utilizing the water activation device have shown an increase in moisture and sugar content resulting in better flavor and healthier fruits, as well as an increase in production. Every single cell in our body uses and needs water to fulfill its cellular purpose.

Activated water provides cells more H+ ions that can help preserve internal cellular water. This means that cells maintain better water in their system, improving cellular function and optimum potential. Better hydration is one thing, but being hydrated with the structured activated water not only improves cellular function but also promotes optimal balance in the digestive tract enhancing self healing abilities and immune system strength.

In plants, the four blade spiral vortex flow and the ceramic ores of the subject invention produce more H+ ions that can help preserve and increase internal cellular water. This means that plant cells will maintain better water in their system, improving cellular function and optimum growth potential. The clustering effect or reduction of space between the water molecules induced by the ceramic ore's resonant activation not only enhances the ability of organisms to absorb water but also effectively improves the plants ability to uptake and utilize nutrients. The plant will transpire (sweat) less allowing for a reduction of irrigation or watering needs by as much as 50% (water conservation). Specifically, the activated water is able to penetrate or permeate through the plants cellular membranes more readily, improving the plants intracellular water which allows the plant to uptake nutrients from the soil more efficiently. The plants transpire less retaining more intracellular water within the plant effectively reducing watering needs by as much as 50%. The plant grows faster and healthier becoming more disease resistant and less prone to attack by insects. The fruits ripen sooner producing a higher yield with tastier and healthier fruits which contain more sugar content (Brix Index). Finally, the activation of the water by the subject device enables intracellular water to remain in the cell with less water evaporation, allowing the produce to stay fresh and moist longer. More hydrogen remains in the cellular water which means the cells survive longer as intracellular water doesn't go bad (anti-oxidation), less shrinkage and prolonged shelf life.

Agriculture industry use of activated water reports many benefits including a substantial decrease in odor (of fecal matter) in livestock operations for both cleaning and consumption. Results show that consumption of the activated, enhanced water raised the grade and quality of the meat, antibiotics usage was decreased, and mortality rate was improved.

Analysis of activated water from the device of the subject invention shows that the surface tension of the water has been decreased. Not only that, the activated water evaporates at a reduced rate than normal water at room temperature. Substances mixed with the activated water such as fertilizers and pesticides will become more effective as they can be utilized and absorbed more efficiently. The mixing ratio of additives can be lowered and effectiveness maintained as the surface tension of the water has been reduced. Blending proficiency is augmented and enhanced.

Figure 6C:
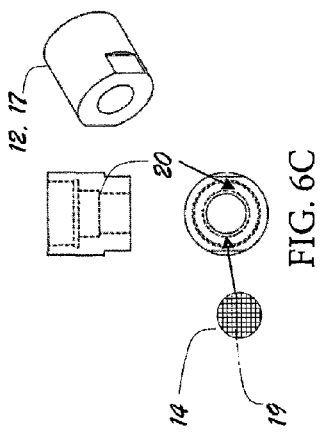
FIG. 6C is an exploded view of the inlet and outlet components of the embodiment shown in FIG. 6A.
Figure 6A:
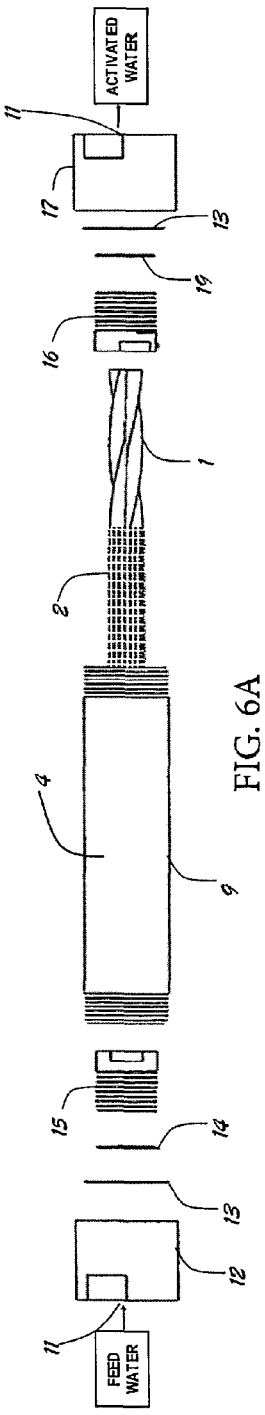
FIG. 6A is a exploded schematic side view of another preferred embodiment of the water activation device of the subject invention.
Figure 6B:
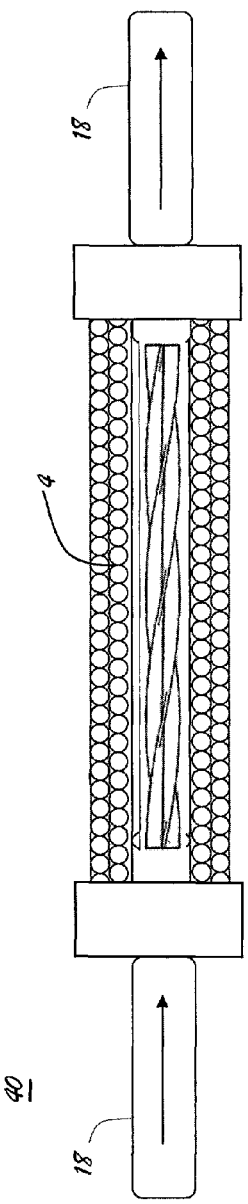
FIG. 6B is a schematic side view of the embodiment shown in FIG. 6A.

Exemplified embodiments of the water activation device 40 of the subject invention are shown in FIGS. 1-6. Each embodiment is configured for placement in a water supply stream or other fluids, and specifically the embodiment shown in FIG. 1 is configured to be placed in a two inch water supply 7 stream. In this embodiment, the device is enclosed in a 4 inch diameter 316L stainless steel 9 or schedule 80 polyvinylchloride (PVC) tube 22 with 316 stainless sleeve (FIG. 3 at 5) inserted within the tube. A 4 inch by 2 inch slip to FIPT reducer flanges 6 connect the 2 inch water supply pipe 7 to the subject device. Flanges 8 at each end of the tube chamber connect to reducer flanges with a gasket 10 between the flanges. Applicants note that the described embodiment is specific for certain situations and state that one skilled in the art would be aware of connections and means by which to fit the subject device into other water systems. Further, applicants describe an embodiment that is placed in a water supply stream, it is noted however that the subject water activation device can easily be a stand alone system for activating water on site.

Four helical blades 26 surrounded by cage 2 as illustrated by caged helix 3 FIG. 1, positioned in the middle of the chamber 9 create a vortex as water moves through the device. In the exemplified embodiment, the blades are two 316L stainless steel straps bent at 90 degree angles welded together and twisted to produce a spiral. The blades however can be formed of any metal, plastic, or composite material that offers the strength and malleability to create the vortex. This quadruple spiral of blade 26 creates four activation chambers 1 through which the water moves and is energized.

The helical blades are surrounded by a cage (caged helix) 3. In a preferred embodiment, this cage is copper. The cage 2 can be copper mesh, copper perforated pipe, or 316L stainless steel. Inlet and outlet baffles are positioned at each end of the cage. In a particularly preferred embodiment, the inlet and outlet baffles are electroplated in gold 14 and silver 19, respectively. The cage can be positioned in this embodiment inside the chamber by screwing it in place or slip fitting it into a flange 6.

Ceramic balls 4 surround the exterior walls of the vortex cage 3 within the chamber 9. The resonating ceramic balls likewise activate the water as it flows over them. The balls are kept out of the blades to insure the blades create a powerful and effective vortex. The strong vortex created by the isolated blades also insures that the fluid to be activated flows through the activating ceramic balls.

Preferably, the activation device of the subject invention is easy to maintain and manipulate. In the exemplified embodiment, the unit is compartmentalized. The blades can be twisted to create a clockwise or counter-clockwise rotation within the activation chamber depending on the application. The unit can be quickly dismantled to clean or change the copper cage 2 or ceramic balls 4.

The water activation device of the subject invention offers four distinct water activation chambers within its quadruple blades. Positioning of ceramic balls 4 outside the vortex creating blades insures maximum movement of the fluid within the device while the presence and exposure to a variety of metals efficiently and effectively structures, energizes, and enhances any water or liquid applied to it.

With reference to FIG. 2 in which like reference numerals refer to like features in FIG., in water activation device 40 all components are the same as FIG. 1 with the exception that the vortex cage 3 within the chamber 9 is centrally positioned and held in place by three 316L stainless steel straps 21 welded to the stainless steel chamber 9 and the vortex cage 3. Within the configuration of this embodiment the gold 14 and silver 19 baffles are placed between two gaskets 10 within the flange fittings 8. Applicants note that the described embodiment is specific for certain situations and state that one skilled in the art would be aware of connections and means by which to fit the subject device into other water systems. This embodiment would be considered for installations consisting of a larger application with higher flow rates.

With reference to FIG. 3 in which like reference numerals refer to like features in FIG., in water activation device 40 all components are the same as FIG. 2 with the exception that the chamber 9 consists of a schedule 80 polyvinylchloride (PVC) tube 22 and the flange fittings 8 are schedule 80 polyvinylchloride (PVC). Within this embodiment a 316 stainless sleeve 5 is inserted within the schedule 80 polyvinylchloride (PVC) tube 22 and secured by means of gluing the insert to the inside wall of the schedule 80 polyvinylchloride (PVC) tube 22. The vortex cage 3 within the chamber 9 is centrally positioned and held in place by three 316L stainless steel straps 21 welded to the stainless steel insert 5 and the vortex cage 3. Applicants note that the described embodiment is specific for certain situations and state that one skilled in the art would be aware of connections and means by which to fit the subject device into other water systems. This embodiment would be considered for installations consisting of applications providing a reduced cost of material for underdeveloped countries or third world nations.

With reference to FIG. 4 in which like reference numerals refer to like features in FIG. 1, in water activation device 40 all components are the same as FIG. 2 with the exception that the chamber 9 consists of a sight glass and fill port 23 for inspection, removal, replacement, or insertion of ceramics into chamber 9. Sight glass and inspection port attached to the vessel allows processes within industrial pipes, tanks, and vessels to be observed visually. While most units consist of a piece of glass sandwiched between two metal flanges other sight windows are available that can provide the users with an easily maintained installation that offer large margins of safety. Applicants note that the described embodiment is specific for certain situations and state that one skilled in the art would be aware of means by which to fit and install the sight glass and all other connections of subject device.

With reference to FIG. 5 in which like reference numerals refer to like features in FIG. 1, in water activation device 40 all components are the same as FIG. 4 with the exception that the chamber 9 is larger in diameter than the inlet and outlet pipe diameter reducer 24 to accommodate sufficient ceramics and flow rate for large scale applications of 8 inch or larger pipe. The reducer pipe 24 is welded onto the main vessel 9. On the inlet and outlet side of the reducer pipe 24 a 316L stainless steel grate or mesh 25 is welded onto the inside edge of the 316L stainless steel flange 8. Preferably, the stainless steel grate or mesh 25 can be electroplated with gold or silver. As with previous embodiments FIGS. 2, 3, and 4 the vortex cage 3 similarly welded within chamber 9 is welded inside the reducer pipe 24 on the end of the inlet side and end of the outlet side and is centrally positioned and held in place by three 316L stainless steel straps 21 welded to the 316L stainless steel reducer pipe 24 and the vortex cage 3. Applicants note that the described embodiment is specific for certain situations and state that one skilled in the art would be aware of connections and means by which to fit the subject device into other water systems. This embodiment would be considered for installations consisting of a larger application and higher flow rates.

With reference to FIG. 6 in which like reference numerals refer to like features in FIG. 1, in water activation device 40 all components are the same with the exception that there are no flange fittings 8 but rather threaded end caps 12, 17 that screw on to threaded vessel chamber 9. The gold 14 and silver 19 baffles are designed to fit inside end caps 12 and 17 respectively into recessed area 20. Core support insert and threaded fittings 15, 16 are designed to thread into recessed area 20 of end caps 12, 17 both securing gold 14, fitting 15 and silver 19 fitting 16 baffles in place and securing the four helix blades 26 and cage 2 as illustrated. Cage helix 3 is designed to fit flush with core support 16 and to fit or be inserted into end cap 17 when cap is threaded on chamber 9. For this particular embodiment the vessel chamber is 2.5 inches in diameter and 18 inches in length. The threads for both the chamber 9 and end caps 12, 17 are 2.5 inch fine pitch straight threads. On the inside of both end caps 12, 17 is a back-up ring or gasket 13 to seal chamber 9 to end caps 12, 17. The caged helix is $^{15}/_{16}$ inch in diameter and is designed to fit into the un-threaded end of core support insert 15, 16 and be welded or secured only on the inlet side of the vessel chamber 9 core support 15. The thread diameter for this embodiment of core support 15, 16 to thread into end caps 12, 17 recessed area is 1.75 inch and is fine pitch straight threads. The inlet and outlet ports 11 on end caps 12, 17 for this particular embodiment are 1 inch FIPT. The ceramic balls 4 surround the caged helix 3 inside chamber 9 and this particular embodiment is designed for 1 inch in and out 18. Applicants note that the described embodiment is specific for certain situations and state that one skilled in the art would be aware of connections and means by which to fit the subject device in fluid communication with other water systems.

It is understood that the foregoing examples are merely illustrative of the present invention. The invention can be as small as 0.5 inches in diameter by 6 inches long or as big as 12 inches in diameter by 6 feet long. The ceramic balls can range in size from 1 mm to 25 mm or larger.

Although the invention has been described in connection with certain embodiments, the invention is not limited to practice in any one specific type of water purification systems. It is contemplated that the invention can be used with a variety of water purification and filtration arrangements and the description of the invention is intended to cover all alternatives, modifications, and equivalent arrangements as may be included within the spirit and scope of the invention as defined by the appended claims. In particular, those skilled in the art will recognize the different modifications of the invention depending on size and application of pipe or other various types of installations of invention as described in the embodiments.

The invention claimed is:
1. A fluid activation device comprising:
a chamber having an inlet and an outlet;
four helical blades disposed in a cage, the cage disposed in the chamber; and ceramic balls disposed between an outer wall of the cage and an inner wall of the chamber;

wherein fluid entering the inlet flows over the blades to create a vortex forcing the fluid to move around the ceramic balls activating and structuring the fluid.

2. The fluid activation device of claim 1, wherein said chamber is tubular.

3. The fluid activation device of claim 1, wherein said cage is copper.

4. The fluid activation device of claim 1, further comprising at least one baffle disposed near at least one of said inlet and said outlet of said chamber.

5. The fluid activation device of claim 4, wherein said at least one baffle comprises a material selected from the group consisting of silver and gold.

6. The fluid activation device of claim 4, wherein a baffle comprising gold is disposed near said inlet of said chamber and a baffle comprising silver is disposed near said outlet of said chamber.

7. The fluid activation device of claim 1, wherein said chamber is made of a material selected from the group consisting of polyvinyl chloride and stainless steel.

8. The fluid activation device of claim 7, wherein said chamber is made of polyvinyl chloride and has a stainless steel sleeve in an interior of said chamber.

9. The fluid activation device of claim 1, wherein said chamber is in fluid communication with a supply line selected from the group consisting of a fuel supply line and a water supply line.

10. A fluid activation device comprising:
a tubular chamber having an inlet and an outlet;
four helical blades disposed in a copper cage, the copper cage disposed in the tubular chamber; and
ceramic balls disposed between an outer wall of the copper cage and an inner wall of the tubular chamber;
wherein fluid entering the inlet flows over the blades to create a vortex forcing the fluid to move around the ceramic balls activating and structuring the fluid.

11. The fluid activation device of claim 10, further comprising at least one baffle disposed near at least one of said inlet and said outlet of said chamber.

12. The fluid activation device of claim 11, wherein said at least one baffle comprises a material selected from the group consisting of silver and gold.

13. The fluid activation device of claim 11, wherein a baffle comprising gold is disposed near said inlet of said chamber and a baffle comprising silver is disposed near said outlet of said chamber.

14. The fluid activation device of claim 11, wherein said tubular chamber is made of a material selected from the group consisting of polyvinyl chloride and stainless steel.

15. The fluid activation device of claim 14 wherein said tubular chamber is made of polyvinyl chloride and has a stainless steel sleeve in an interior of said tubular chamber.

16. The fluid activation device of claim 10, wherein said chamber is in fluid communication with a supply line selected from the group consisting of a fuel supply line and a water supply line.

17. A fluid activation device comprising:
a tubular chamber having an inlet and an outlet, a baffle comprising gold disposed near the inlet of the tubular chamber and a baffle comprising silver disposed near the outlet of the tubular chamber;
four helical blades disposed in a copper cage, the copper cage disposed in the tubular chamber; and
ceramic balls disposed between an outer wall of the copper cage and an inner wall of the tubular chamber;
wherein fluid entering the inlet flows over the blades to create a vortex forcing the fluid to move around the ceramic balls activating and structuring the fluid.

18. The fluid activation device of claim 17, wherein said tubular chamber is made of a material selected from the group consisting of polyvinyl chloride and stainless steel.

19. The fluid activation device of claim 18, wherein said tubular chamber is made of polyvinyl chloride and has a stainless steel sleeve in an interior of said tubular chamber.

20. The fluid activation device of claim 17, wherein said chamber is in fluid communication with a supply line selected from the group consisting of a fuel supply line and a water supply line.

* * * * *